Patented Apr. 3, 1928.

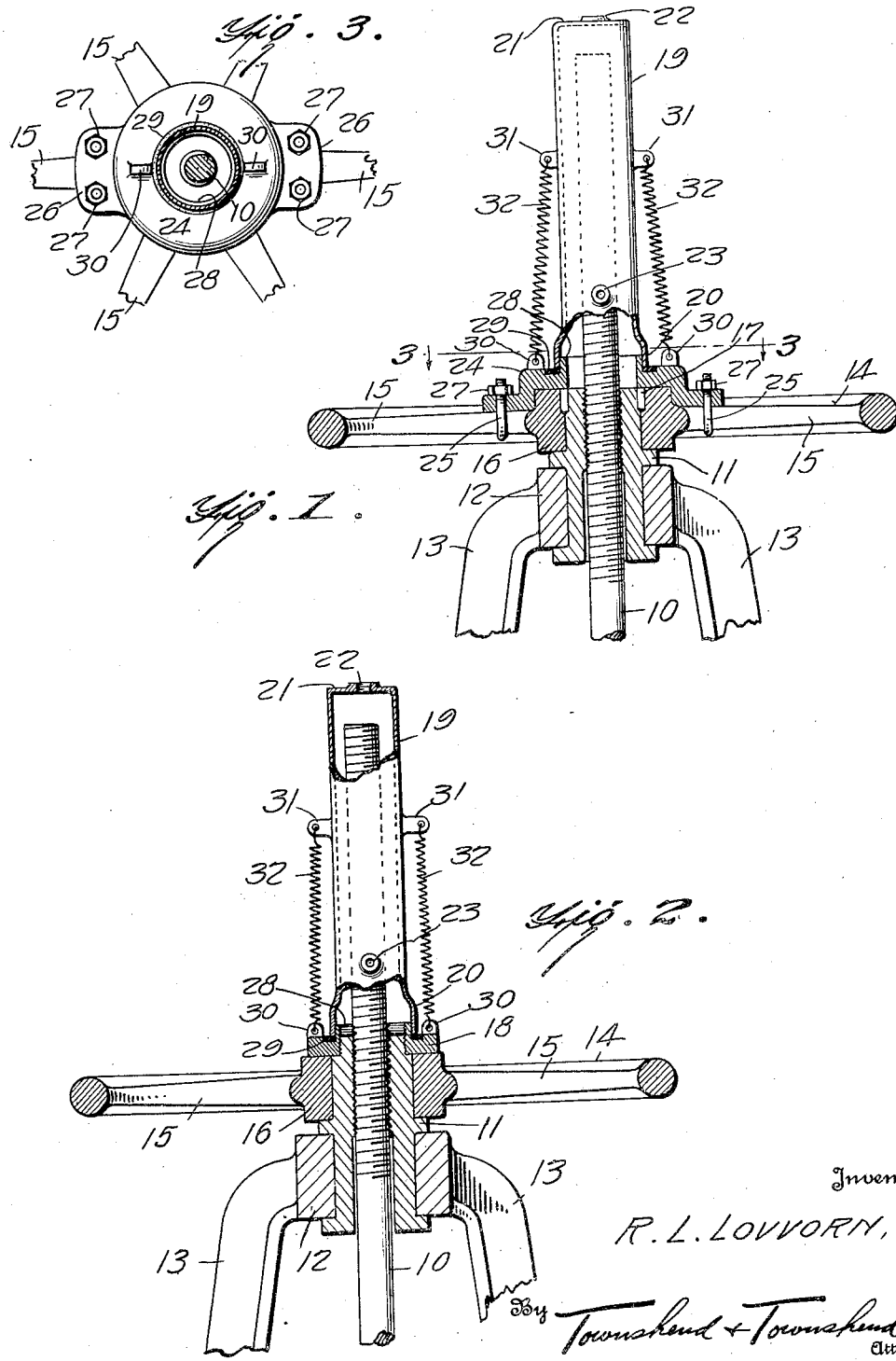

1,664,694

UNITED STATES PATENT OFFICE.

ROBERT L. LOVVORN, OF GADSDEN, ALABAMA.

VALVE-STEM PROTECTOR.

Application filed May 31, 1927. Serial No. 195,344.

The present invention relates to gate valves of the type having a rising stem operated by the usual hand wheel, and has for its primary object the provision of means for protecting the upper exposed threaded end of such stems against the accumulation of any dirt or rust thereon, such as in present similar valve structures seriously impairs the efficient operation of the valve.

Another object is the provision of an automatically closing follower cap for the upper end of the rising valve stem, and adapted to retain a lubricant in contact with the stem.

A further object is the provision of a novel assembly and mounting for such a cap relative to the hand wheel and stem.

Having these and such further objects in view as will be apparent to those skilled in the art, I have herein described, and illustrated in the accompanying drawings, a practical physical embodiment of the principles of the invention.

In the drawings, Figure 1 is an elevation, partly in section, of the top frame of a rising stem gate valve, illustrating the mounting of the protecting cap in service. Figure 2 is a similar elevation of a slightly modified embodiment. Figure 3 is a horizontal section on the line 3—3 of Figure 1.

As shown, 10 represents the vertically movable stem of a gate valve, threaded at its upper end through a swivel nut 11 retained in a spider 12 at the top of the frame 13, the nut 11 being rotated through its connection with the horizontal operating hand wheel 14 having radial arms 15 and a hub 16 secured to the body of the nut 11 either by means of the dowel pins 17 as shown in Figure 1, or held in place by an anchor nut 18, as shown in Figure 2. It will be obvious that according to the direction of rotation of the hand wheel 14 the valve stem 10 will move vertically either up or down.

In the form of the invention shown in Figures 1 and 3 the upper exposed end of the valve stem 10 is protected from rust and accumulation of dirt thereon by the disposition thereover of a cap 19 formed with a cylindrical barrel having a flared open lower end 20 and a closed upper end 21 provided with a lubricant feed aperture 22. The cap 19 is of a length sufficient normally to rest with its closed upper end 21 spaced above the top of the valve stem 10 when the stem is in valve closed position, and its internal diameter is such that a clearance is provided between the barrel and the valve stem, forming a chamber for the reception and retention of lubricant supplied thereto either through the top feed aperture 22 or a side feed aperture 23 formed in the barrel.

As a means for securing the protector cap in position the hand wheel 14 is provided, in the form shown in Figures 1 and 3, with a false hub 24 formed for fitted engagement over the top of the wheel hub 16 and attached in place through the medium of U bolts 25 passed under the wheel arms 15 and through suitable apertures formed in radial ears 26 extending laterally from the false hub and integral therewith. Nuts 27 threaded over the upper ends of the U bolts serve to clamp the ears 26 to the arms of the hand wheel whereby simultaneous movement of the wheel and false hub is assured. At its central portion the false hub is formed with an upright annular shoulder 28 surrounding the valve stem in spaced relation and cooperating with the flared lower end 20 of the cap 19 to form an internal guide therefor. Surrounding the shoulder 28 the false hub is provided with a washer 29 suitably seated thereon for engagement by the flared end of the cap to provide a leak proof closure.

The false hub 24 is provided at diametrically spaced points with upstanding lugs 30 between which and similar lugs 31 extending laterally from diametrically opposed points on the cap 19 are connected tension elements in the form of contraction springs 32, the purpose of which is to maintain the cap in position with its lower flared end engaged against the washer 29.

In the form shown in Figure 2 the only difference over the form shown in Figures 1 and 3 is in the cap attachment, other parts remaining the same and being designated by like reference numerals. The structure shown in Figure 2 is of the type wherein the hand wheel is secured in place by an upper anchor nut 18. In this instance this nut 18 is recessed for reception of the washer 29 and is substituted in place of the false hub before described. The lugs 30 are formed directly on the anchor nut, which is also formed with the shoulder 28, being however internally threaded for the obvious purpose of engagement over the upper portion of the swivel nut 11.

In service, as the valve stem 10 is raised by operation of the hand wheel, it will engage and lift the cap 19 from its seat on the washer 29, the springs 32 permitting the cap to travel upwardly with the stem and acting to draw the cap down upon its washer seat as the stem 10 is lowered. It will thus be apparent that the upper portion of the valve stem is at all times covered by a protecting cap which also retains a lubricant in proximity to the stem. The cap automatically follows the movement of the stem.

It is to be understood that the invention is not to be limited to the exact structural details shown and described, as these constitute but an embodiment thereof, but that any desired changes and modifications may be made in such details as will fall within the scope of the invention as claimed.

I claim:—

1. A protector for longitudinally movable valve stems, comprising a cap adapted to house a portion of a valve stem therein, an operating member for moving said stem, and tension elements connecting said cap with said operating member.

2. A protector for longitudinally movable valve stems, comprising a cylindrical cap housing a portion of a valve stem, said cap being movable by engagement of said stem therewith in one direction, an operating element for said stem, and tension elements connecting said operating element and cap for moving said cap in an opposite direction.

3. In a rising stem gate valve assembly, a frame, a stem movable longitudinally therethrough, a hand wheel in operative engagement with said stem for moving the same, a cap disposed over one end of said stem, lugs formed on said cap, and contraction springs connected between said lugs and points on said hand wheel.

4. In a rising stem gate valve assembly, a hand wheel, a valve stem movable therethrough, a cap disposed over said stem at one side of said wheel, said cap having an open end adjacent said wheel, a seat for the said cap end carried by said wheel, and tension elements connecting said cap and seat for retaining said cap engaged thereagainst.

In testimony whereof I affix my signature.

ROBERT L. LOVVORN.